UNITED STATES PATENT OFFICE.

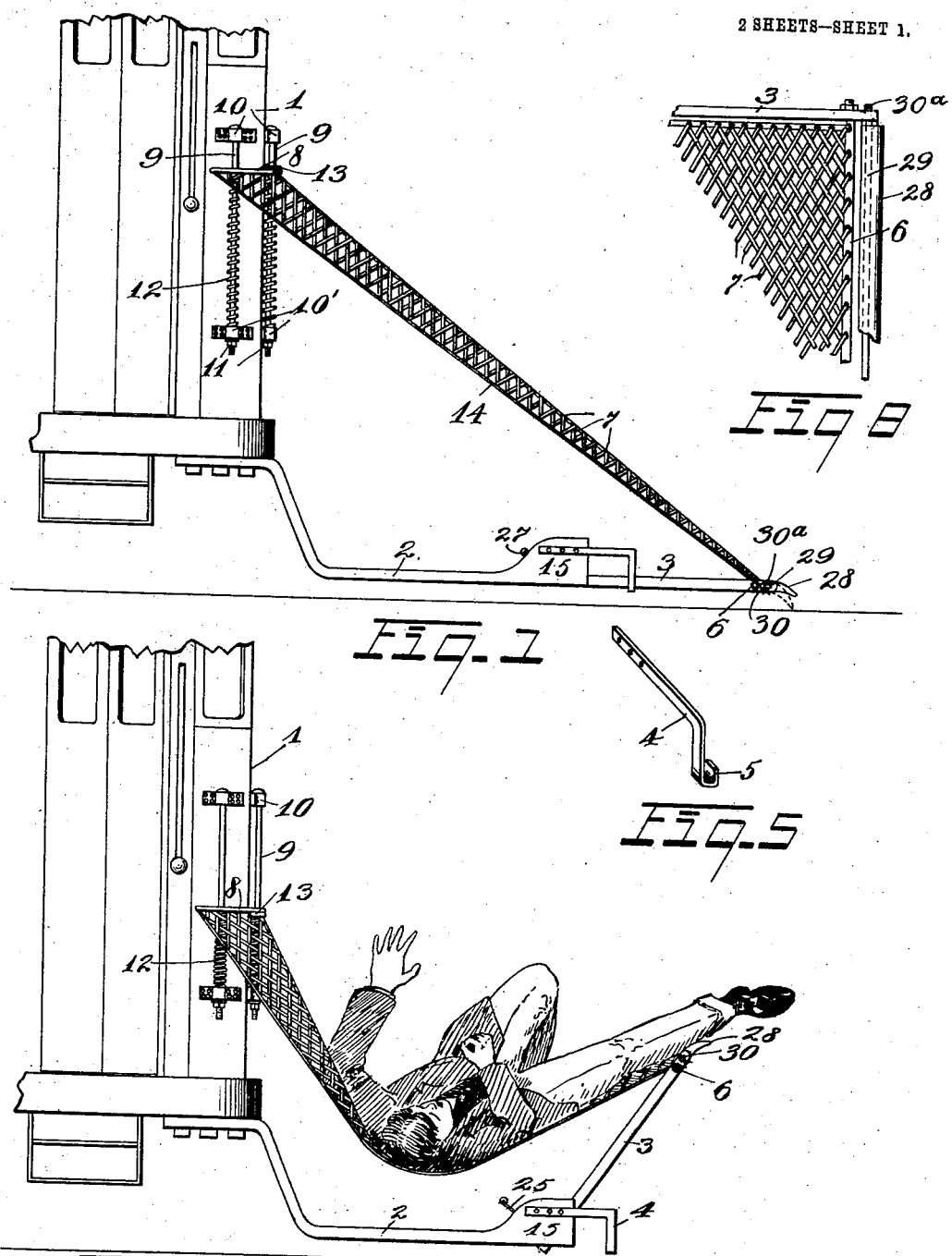

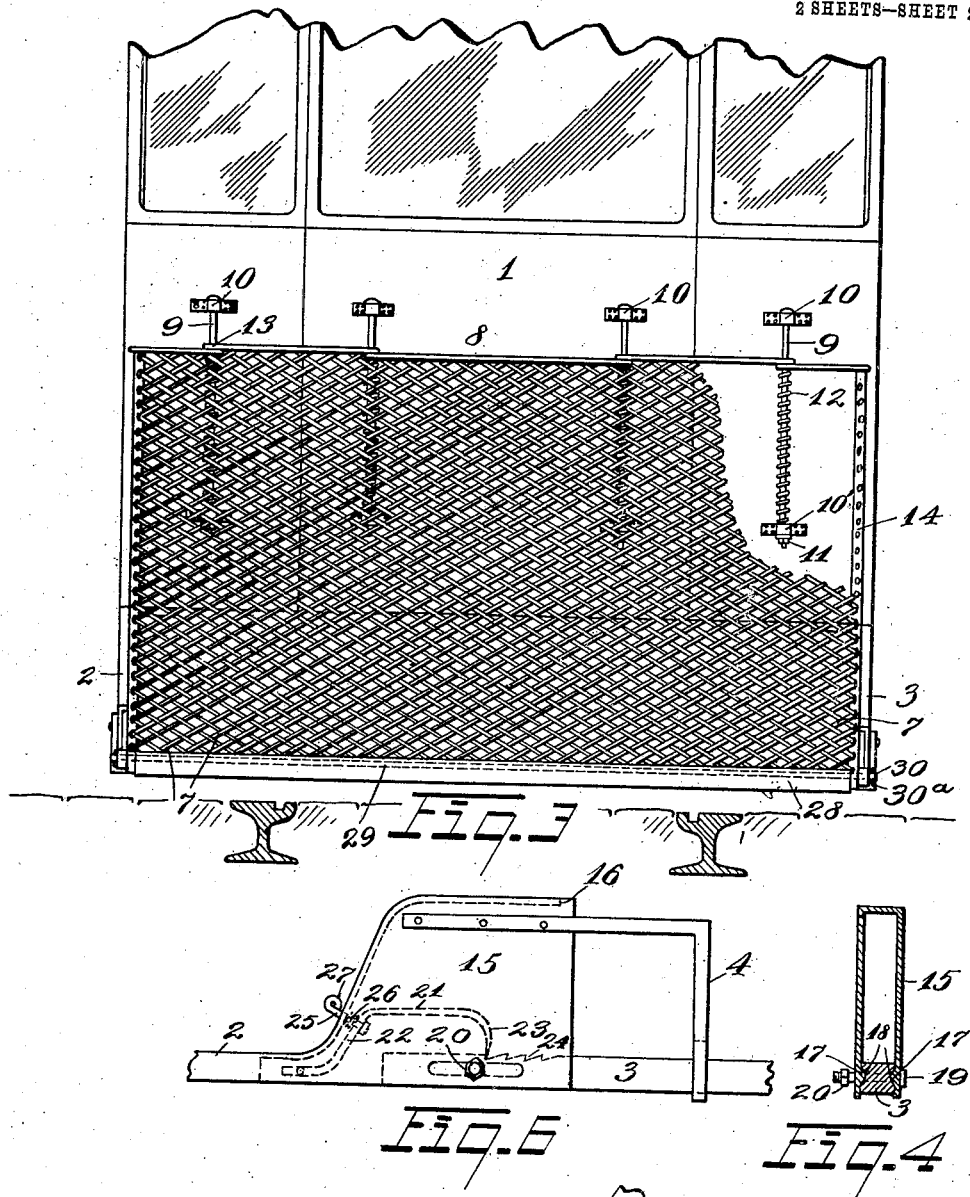

CHARLES K. WEHN, OF ELYRIA, OHIO.

FENDER.

No. 894,357.   Specification of Letters Patent.   Patented July 28, 1908.

Application filed November 22, 1907. Serial No. 403,250.

*To all whom it may concern:*

Be it known that I, CHARLES K. WEHN, a citizen of the United States, residing at Elyria, in the county of Lorain and State of Ohio, have invented a certain new and useful Improvement in Fenders, of which the following is a full, clear, and exact description, reference being had to the accompanying drawings.

This invention relates to fenders for use with vehicles, such as street cars and automobiles, and has for its object to provide a fender of this type which, while comparatively cheap of production, shall be so constructed as to subject an object struck thereby to a minimum shock and shall prevent such object from being dragged or drawn beneath the wheels of the vehicle or from being subsequently deposited or delivered on the roadway in front of the vehicle.

The invention comprises, in its construction, a yielding impact device which is capable of softening the blow delivered to the object and also of preventing the object from passing under the fender; also means whereby the fender may be converted into a receptacle for the object, which receptacle will prevent the object struck from being deposited in front of the moving vehicle; also means whereby the fender may yield when the object is deposited thereon to soften the impact and avoid injury. In the event that my fender should strike an animate object, it will reduce to a minimum the shock sustained and will prevent subsequent injury to such object.

Generally speaking, the invention may be defined as consisting of the combinations of elements embodied in the claims hereto annexed, and illustrated in the drawings forming part hereof, wherein Figure 1 represents a side elevation of the front of a vehicle having my fender applied thereto; Fig. 2 represents a similar view showing the position which the fender assumes when an object is deposited thereon; Fig. 3 represents a front elevation of such vehicle with the fender in the position shown in Fig. 1; Fig. 4 represents a detail of the pivotal connection between the front and rear side members of the fender; Fig. 5 represents a detail in perspective of the support for the front or movable side member; Figs. 6 and 7 represent enlarged detail views of the frame to which the movable side member is pivoted; and Fig. 8 represents a top plan view of a portion of the front of the vehicle.

The fender, as an entirety, comprises generally a pair of side bars projecting forwardly from the vehicle, each side bar comprising a fixed member attached at its inner end to the vehicle and an outer movable member pivoted to said fixed member; also an upper and a lower frame member carried respectively by the front of the vehicle and by the movable side members; a plurality of yielding supports for the frame member which is attached to the front of the vehicle; a supporting surface in the form of a netting connected to the upper and lower members; and a yielding buffer or impact device also carried by and extending between the movable side members.

Describing the parts by reference characters, 1 denotes the front of the vehicle, illustrated herein as a street car; 2 denotes the fixed side members, the inner ends of which are attached to any convenient portion of the vehicle, as by being bolted to the underside of the platform. These fixed members are bent downwardly from their points of connection with the platform to a suitable distance from the track or roadbed, whence they project forwardly. Each fixed member has pivoted at the outer end thereof a movable side member 3. Details of construction of the connection between such fixed and movable members will be described hereinafter. For the purpose of supporting the member 3 in its normal or lowered position, a brace 4 is employed which is connected to the fixed member and is provided at its lower end with an inwardly extending U-shaped projection or hook 5, which is adapted to receive member 3 and support the same in the position shown in Figs. 1 and 6.

6 denotes a rod extending between and supported by members 3. This rod may be of brass and will be provided with a suitable number of perforations for lacing or otherwise securing thereto the lower ends of the strands 7 of the netting, which constitutes a supporting surface for any object that may be thrown onto the fender. The upper ends of said strands are secured in like manner to a rod 8. This rod is yieldingly supported from the front of the vehicle in the following manner:—9 denotes a suitable number of vertical bolts which are applied to the front of the vehicle. These rods may be conveniently supported by vertically alined clips 10, 10′ which are riveted or otherwise secured to the front of the vehicle and are provided with alined apertures for the reception of said bolts. The lower ends of the bolts extend through the lower clips and are provided with nuts 11. On each bolt there is mounted a spiral spring 12, the lower end whereof rests on clip 10', said springs being of sufficient length to support rod 8 adjacent to the clips 10. Rod 8 may be conveniently formed from a suitable length of brass tubing, said tubing being bent at suitable intervals to form loops 13 for the reception of the bolts 9.

The ends of the strands which extend to the sides of the fender are secured to heavy flexible stays 14. Such ends may be secured to such stays in the same manner as to rods 6 and 8, namely; by lacing through the perforations formed therein. By the construction just described, a netting is formed for the reception of any object that may be struck by the fender and, for the purpose of reducing to a minimum the injury to such object, I employ for the strands and stays material which is relatively soft and yielding. For instance, the stays and the strands may be of rawhide, as this material, while flexible, is well adapted to withstand exposure to the elements and the incidents of use.

As a connection between the inner ends of members 3 and outer ends of members 2, I preferably employ the construction illustrated in detail in Figs. 4, 6 and 7. The outer end of member 2 carries a frame 15, which may be cast therewith or otherwise suitably secured thereto. This frame comprises a pair of side members which are spaced apart to permit the movement of pivoted member 3 therebetween. The lower end of said frame is open, but the upper end is preferably closed by a web, said web extending nearly to the front end of said frame, but terminating short of such end to form a stop 16, indicated in dotted lines in Figs. 6 and 7, for the pivoted side member 3. Each side of frame 15 is provided with an elongated inwardly projecting boss 17 having its edges rounded and adapted to fit into a corresponding recess 18 in member 3. 19 denotes a bolt extending through the joint thus formed and pivotally connecting member 3 to the frame. This bolt is provided with a nut 20 thereon, sufficient space being left between said end and the adjacent side of the frame 15 to permit the lower ends of the sides of said frame to separate and permit the member 3 to move upwardly.

When the weight of a body is thrown upon the lacing or netting of the fender, there is a tendency for the outer ends of the arms or members 3 to move upwardly, which tendency is resisted by the engagement of the bosses 18 on the lower ends of the sides of frame 15 with the recesses 18 in said members. As the lower ends of the sides are not connected, the sides of member 15 will spring apart at the bottom sufficiently to enable the members 3 to move upwardly on bolt 19 as a pivot, the spacing of the nut 20 on said bolt accommodating this springing and parting of the lower ends of the sides of the frames.

21 denotes a spring hook which is pivotally secured to the frame 15 adjacent to the inner end thereof. This hook is provided with an upwardly extending portion 22 substantially parallel with the web between the side members 15 and with an outwardly projecting portion terminating in the hook proper 23. This hook is adapted to engage a notch 24 in the inner end of the pivoted side member 3, and, as said hook is made of spring material, it opposes a yielding resistance to the upward movement of said member 3.

25 denotes a short rod which extends through the web at the top of frame 15 and is connected at its lower end to the hook 21. This rod is provided with a spiral spring 26 interposed between the hook and the web. This spring also serves to cushion the impact of 3 against the stop 16. The upper end of rod 25 is provided with an eye 27, by means of which the lower end of the hook may be disengaged from the notch in 3 to permit the latter to drop to normal position.

At the front of my device there is provided the impact device or buffer 28. This device is made of resilient material, preferably rubber, which is molded onto a rod 29, said rod being non-rotatably supported between the ends of members 3. A convenient manner of securing said rod in place is by reducing the ends to form oblong extensions 30, which are adapted to fit within corresponding oblong or elongated recesses in the front ends of the pivoted members 3, whereby rotation of rod 29 is prevented, the rod being secured in place by cotter pins 30$^a$.

The buffer 28 is of the shape shown in Figs. 1 and 2 and is applied to the rod 29 in such manner as to provide a yielding impact edge. As shown, it projects forwardly and slightly downwardly from the rod 29, being reduced in thickness toward the front end thereof. On striking an object, it bends downwardly, as indicated in dotted lines in Fig. 1, whereby the impact upon the object is reduced and the space between the front end of the fender and the ground or roadway is substantially closed, making it practically impossible for an object to be dragged therebeneath. The impact being in the line of member 3, there is no tendency for the front or outer end of the fender to be thrown upwardly. When the object strikes upon the top of the netting, as illustrated in Fig. 2, the members 3 immediately move upwardly on their pivots until they engage their stops 16. The springs 12 yield downwardly, absorbing most of the shock occasioned by the impact of the object upon the top of the netting, and the netting forms, in effect, a receptacle which retains the object until the vehicle can be stopped.

From the above description, it will be apparent that I have produced a device which is particularly effective in operation; which will reduce the liability of injury by impact to a minimum; and which will act automatically to cushion the blow inflicted by the fall of an object thereonto and to form a receptacle for the retention of such object.

Having thus described my invention, I claim:

1. A fender comprising, in combination, a pair of side members, a rod extending therebetween and supported thereby, an impact member of rubber or similar flexible material rigid with said rod and projecting forwardly and downwardly therefrom, and means for retaining said rod against rotation, substantially as specified.

2. A fender comprising, in combination, a pair of side members having elongated slots therein, a rod having elongated ends fitted in said slots, and a rubber buffer molded on said rod, said buffer having a portion which projects forwardly and downwardly from said rod and is reduced in thickness toward the outer end thereof.

3. The combination, with the front of a vehicle, of a fender, and means for securing the fender to the front of the vehicle, said means comprising rods secured to the front of the vehicle, spiral springs on said rods, and a supporting member for the rear of the fender operatively engaging said springs, substantially as specified.

4. The combination, with the front of a vehicle, of a fender, and means for securing the same to the vehicle front, said means comprising vertically-alined clips carried by the front of the vehicle, vertical rods supported by said clips, spiral springs on said rods, and a fender-supporting member mounted on said rods and operatively engaging said springs, substantially as specified.

5. The combination, with a vehicle, of a pair of side members projecting forwardly therefrom, a second side member pivoted to each of the former members, frictional means for normally retaining the pivoted members in substantially horizontal position, and a fender having the front end thereof supported by the pivoted members, substantially as specified.

6. The combination, with a vehicle, of a pair of side members projecting forwardly therefrom, a second pair of side members each pivoted to one of the former members, means for frictionally retaining said pivoted members in operative relation to the former members, said means comprising a lug or projection on each of one pair of said members and a recess in each of the other pair of members and a pivot pin extending through said recesses and lugs, and a fender having the front end thereof supported by the pivoted side members, substantially as specified.

7. The combination, with a vehicle, of a pair of fixed side members projecting forwardly therefrom, a pair of movable side members carried by the fixed side members and projecting forwardly therefrom, means for pivotally connecting the latter members to the former members, said means comprising a pair of side plates on the fixed side member having oppositely located inwardly projecting portions, recesses in the movable member adapted to receive such projections, a pivot bolt extending through such side plates and through the said recesses and projections, and a fender having the front end thereof supported by the movable side members, substantially as specified.

8. The combination, with a vehicle, of a pair of fixed side members projecting forwardly therefrom, each of said members having at the outer end thereof a frame, a movable side member pivoted to said frame and projecting forwardly therefrom, a stop carried by said frame above said pivot for limiting the upward movement of the movable side member, and a fender having the front end thereof carried by the movable side members, substantially as specified.

9. The combination, with a vehicle, of a pair of fixed side members projecting forwardly therefrom, each having at its outer end a frame, said frame comprising a pair of spaced plates the upper portions whereof are connected by a web, a movable side member pivoted to said frame and adapted to engage said web as a stop, a spring carried by each frame and adapted to resist the upward movement of its movable side member, and a fender having the front end thereof supported from the movable side members, substantially as specified.

10. The combination, with a vehicle, of a pair of fixed side members projecting forwardly therefrom and each having at its outer end a frame, each frame comprising a pair of side plates the upper ends whereof are connected by a web, movable side members pivoted to each frame and adapted to be engaged by said web to limit the upward movement thereof, a spring having a downwardly projecting end adapted to engage the movable side member beyond the pivot thereof, a rod extending through said web and connected to said spring, a spiral spring surrounding said rod and interposed between said web and the former spring, and a fender having the front end thereof secured to said movable side members, substantially as specified.

11. The combination, with a vehicle, of a pair of fixed side members projecting forwardly therefrom, a movable side member pivoted to each of the former members, and a spring having a downwardly projecting end adapted to engage each movable side member beyond the pivot thereof, substantially as specified.

12. The combination, with a vehicle, of a pair of fixed side members projecting forwardly therefrom and each provided at the front end thereof with a frame, said frame comprising a pair of side plates, each of said plates being provided with inwardly directed projections, a movable side member having its opposite faces provided with recesses adapted to engage said projections on the plates, a pivot bolt extending through said projections and recesses, a spring for resisting the upward movement of each side member, a stop carried by said frame and adapted to limit the upward movement of each movable side member, and a fender having the front end thereof supported by said movable side members, substantially as specified.

13. The combination, with a vehicle, of a pair of fixed side members projecting forwardly therefrom and each provided at the front end thereof with a frame, a movable side member pivoted to each frame and having notches beyond the pivot thereof, a spring for resisting the upward movement of each movable side member, said spring having a hooked end adapted to engage said notches, and a fender having the front end thereof supported by said movable side members, substantially as specified.

14. The combination, with a vehicle, of a pair of fixed side members projecting forwardly therefrom, a movable side member pivoted to each fixed side member and projecting forwardly therefrom, a fender having the front end thereof carried by said movable members, and a support extending forwardly from the fixed side member and adapted to engage the movable side member beyond the pivot thereof, substantially as specified.

15. A fender comprising a pair of rawhide side stays each having perforations therethrough, a front and a rear supporting rod having perforations therethrough, and a netting extending between said side stays and said rods and laced through the perforations thereof, substantially as specified.

16. The combination, with a vehicle, of a plurality of vertical rods carried thereby, spiral springs mounted on said rods, and a fender having at the rear end thereof a rod provided with loops mounted on the vertical rods and operatively engaging the springs thereon, substantially as specified.

17. A fender comprising, in combination, a receptacle of netting or similar material, a front and a rear support for said netting, a pair of side members having elongated slots therein, a rod having elongated ends fitted in said slots and a rubber buffer molded on said rod, said buffer having a portion which projects forwardly and downwardly from said rod and is reduced in thickness toward the outer end thereof.

In testimony whereof, I hereunto affix my signature in the presence of two witnesses.

CHARLES K. WEHN.

Witnesses:
T. W. SHEARER,
GEO. C. KELLAR.